CURRENT PULSE DRIVER WITH MEANS TO STEEPEN AND STABILIZE TRAILING EDGE

Filed June 3, 1966

INVENTOR.
CLIFFORD E. GRANGER
BY
Carl V. Olson
Attorney

United States Patent Office 3,470,391

Patented Sept. 30, 1969

3,470,391

CURRENT PULSE DRIVER WITH MEANS TO STEEPEN AND STABILIZE TRAILING EDGE

Clifford E. Granger, Burlington, Mass., assignor to RCA Corporation, a corporation of Delaware Filed June 3, 1966, Ser. No. 555,186
Int. Cl. H03k *1/18*
U.S. Cl. 307—270 2 Claims

ABSTRACT OF THE DISCLOSURE

A transistor driver for supplying a current pulse with steep and stabilized edges to a load such as a line in a magnetic memory. An input pulse is coupled through a transformer to an output transistor, which is driven to saturation. The input pulse is also coupled through a differentiator and a second transistor to the output transistor to cause a steep, time-stabilized trailing edge on the pulse from the output transistor by sweeping out the stored charge.

Figure 1:
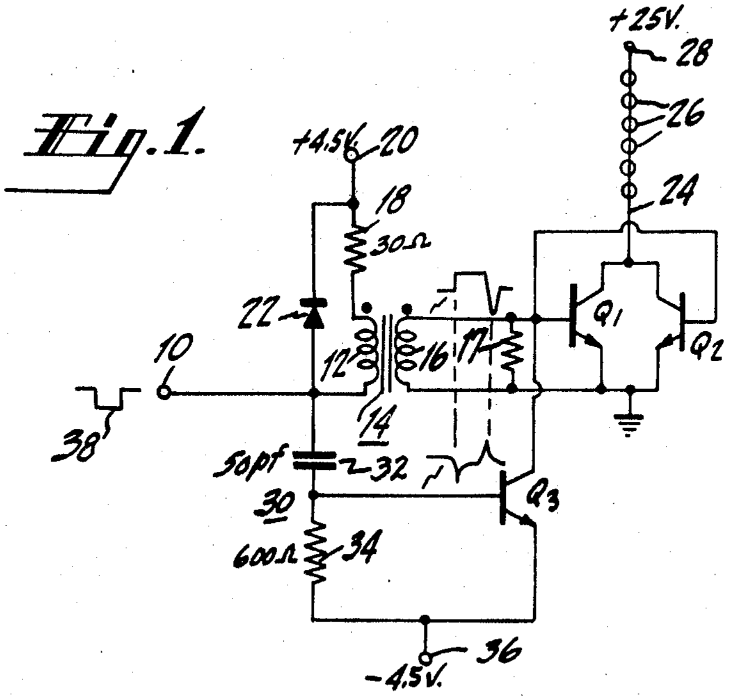

This invention relates to a current pulse driver, and particularly to a transistor circuit for supplying a current pulse having steep leading and trailing edges to a load which may consist of a plurality of magnetic memory elements.

A current pulse applied to a plurality of magnetic memory elements to switch their magnetic states should have a steep leading edge, a stable high-current level, and a steep trailing edge occurring at a constant time following the leading edge. When a transistor driver circuit is employed, the first two requirements are achieved by driving the transistor to saturation in generating the desired output pulse. However, a transistor when saturated, is difficult to turn off rapidly because of the presence of minority charge carriers stored in the transistor. The time required to remove the stored charge is affected by several factors which are difficult to control, such as the ambient temperature and the amplification characteristics of the particular transistor in the circuit. Typically, the turn-off time of a transistor may vary over a range of 65 nanoseconds. The resulting variation in the width of the current pulse applied to a magnetic memory must be allowed for, with the result that the operation of a read-write cycle in the memory takes a longer time than is desired.

It is an object of this invention to provide an improved transistor driver circuit including means to stabilize and steepen the railing edge of the output current pulse.

It is another object to provide an improved transistor current driver circuit characterized in very rapid turn-on and very rapid turn-off, in requiring relatively few power supply bias voltages, in providing an isolation that protects the transistors in the circuit from being burned up due to a malfunction in the source supplying an input control signal, and in having an isolation which protects the input control signal source from large voltage swings occurring in a driven magnetic memory.

In accordance with an example of the invention, there is provided a current pulse driver including a first normally-nonconducting transistor having output electrodes coupled to a utilization device such as a selection line in a magnetic memory. A transformer is provided having a primary winding connected to a circuit input terminal and having a secondary winding coupled to the input electrodes of the first transistor. A differentiator circuit is connected between the circuit input terminal and the input electrodes of a second normally nonconducting transistor. The output electrodes of the second transistor are connected to the input electrodes of the first transistor. An input control pulse applied to the circuit input terminal is coupled through the transformer to render the first transistor conductive to saturation for the duration of the input pulse. At the trailing edge of the input pulse, the differentiator produces an output spike which is amplified in the second transistor. The output of the second transistor sweeps the stored charge from the input electrodes of the first transistor and causes it to turn off at a stabilized time not affected by uncontrollable environmental and inherent characteristics. The inclusion of the transformer provides a direct-current isolation which protects circuit elements, which provides desired polarity inversions, which operates more rapidly than a coupling transistor, and which reduces the number of bias potential sources needed.

Figure 2:
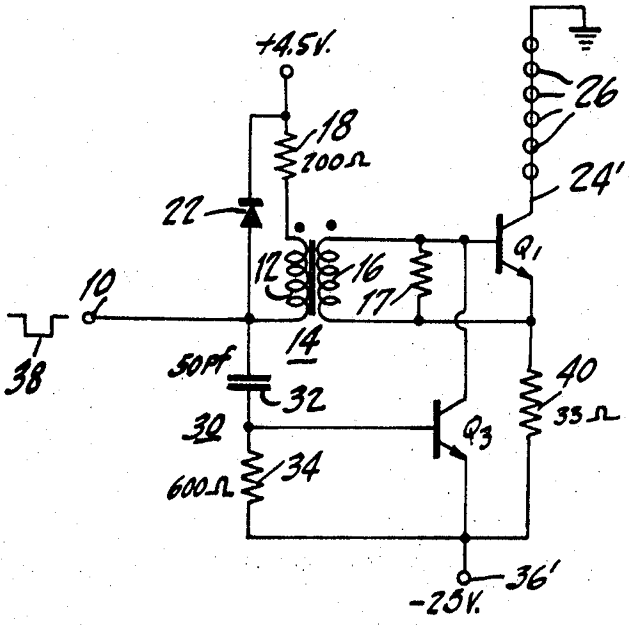

In the drawing:

FIG. 1 is a circuit diagram of a transistor current driver constructed according to the teachings of the invention; and FIG. 2 is a circuit diagram of a similar transistor current driver which differs from the driver of FIG. 1 in the bias supply arrangements.

Referring now in greater detail to FIG. 1, the transistor current pulse driver has an input terminal 10 from which a negative-going input control signal may be coupled to the primary coil 12 of a transformer 14 having a secondary winding 16. A resistor 17 may be connected across the secondary winding 16 to damp oscillations therein. One end of the primary winding 12 is connected through a resistor 18 to a bias potential source 20. A clamp diode 22 is connected between the terminals 10 and 20 to prevent the coupling to the transformer of positive input signals exceeding the voltage of the bias source at terminal 20.

The secondary winding 16 of transformer 14 is connected across the base and emitter electrodes of a first transistor $Q_1$. A transistor $Q_2$ is connected in parallel with transistor $Q_1$ to double the available output current. The collectors of transistors $Q_1$ and $Q_2$ are connected through a memory drive line 24 linking a plurality of magnetic memory elements 26 to a bias potential terminal 28.

A differentiator 30 including a capacitor 32 and a resistor 34 is connected between the circuit input terminal 10 and a bias potential terminal 36. The output of the differentiator 30 is connected across the base-emitter electrodes of a second transistor $Q_3$. The collector-emitter output electrodes of transistor $Q_3$ are connected in circuit between the base electrode of first transistor $Q_1$ and the bias potential terminal 36.

In the operation of the transistor current pulse driver circuit of FIG. 1, a negative input control pulse 38 applied to circuit input terminal 10 is coupled through transformer 14 in a polarity to render the first normally nonconducting transistor $Q_1$, $Q_2$ fully conductive to saturation. The first transistor $Q_1$, $Q_2$ remains conductive to saturation for the duration of the input signal, and thereafter the turning-off of the first transistor $Q_1$, $Q_2$ depends on the removal of stored charge from the transistor.

The input signal 38 is also applied to the differentiator 30 which generates a negative-going leading edge spike and a positive-going trailing edge spike. The negative-going leading edge spike from the differentiator 30 has no effect on the normally nonconducting second transistor $Q_3$. The trailing edge spike from the differentiator 30, however, renders the second transistor $Q_3$ fully conductive for a short period of time. The resulting conduction through second transistor $Q_3$ sweeps the stored charge from the first transistor $Q_1$, $Q_2$ and results in a rapid, stabilized turning-off of conduction through the first transistor $Q_1$, $Q_2$.

The turning-off of the first transistor $Q_1$, $Q_2$ is stabilized to a time range within about 10 nanoseconds, whereas without the differentiator and second transistor $Q_3$, the turn-off time typically fluctuates over a time range of 65 nanoseconds. The saving of 55 nanoseconds is very important in that it permits a corresponding, or greater, reduction in the operating read-write cycle time of the memory driven by the circuit. The duration of the output current pulse may be about 100 nanoseconds, so that the trailing edge when limited to 10 nanoseconds is a reasonably small proportion of the width of the plateau of the pulse.

The circuit of FIG. 2 is similar to the circuit of FIG. 1, and corresponding circuit elements are given the same reference numerals. The circuit of FIG. 2 differs in the arrangement of the bias potentials to permit the driving of a memory line 24' which is grounded at one end. To provide a sufficient bias for the transistors $Q_1$ and $Q_3$, the terminal 36' is connected to a bias potential source supplying −25 volts. A resistor 40 is connected from the terminal 36' to the secondary winding 16 of transformer 14 to provide a bias potential for the second transistor $Q_3$. The resistor 40 develops a voltage drop thereacross of −4.5 volts which corresponds with the bias source connected to terminal 36 in the circuit of FIG. 1. In other respects the operation of the circuit of FIG. 2 is the same as has been described in connection with the circuit of FIG. 1. The circuit of FIG. 2 has the advantage of requiring one less different bias potential voltage source than the circuit of FIG. 1.

What is claimed is:

1. A pulse circuit comprising a first normally nonconducting transistor having input electrodes and having output electrodes coupled to utilization means, a circuit input terminal, a transformer having a primary winding connected to said circuit input terminal and having a secondary winding coupled to input electrodes of said first transistor, means to apply an input pulse to said circuit input terminal for coupling through said transformer to render said first transistor conductive to saturation for the duration of said input pulse, whereafter stored charge in the transistor delays its return to the nonconducting condition, a differentiator having an input coupled to said circuit input terminal and having an output providing a spike at the trailing edge of said input pulse, and a second normally nonconducting transistor having input electrodes coupled to the output of said differentiator to be rendered conductive by the output spike from the differentiator, said second transistor having output electrodes connected to input electrodes of said first transistor to sweep the stored charge therefrom.

2. A pulse circuit as defined in claim 1 wherein said first and second transistors are of the same conductivity type.

References Cited

UNITED STATES PATENTS

| | | | |
|---|---|---|---|
| 2,997,600 | 8/1961 | Hilberg et al. | 307—88.5 |
| 3,094,627 | 6/1963 | Van Lottum | 307—88.5 |
| 3,215,858 | 11/1965 | Harding et al. | 307—88.5 |

ARTHUR GAUSS, Primary Examiner

R. L. WOODBRIDGE, Assistant Examiner

U.S. Cl. X.R.

307—268, 280, 282, 300